United States Patent
Kanai et al.

(10) Patent No.: US 12,511,910 B2
(45) Date of Patent: Dec. 30, 2025

(54) SELF EXTRINSIC SELF-CALIBRATION VIA GEOMETRICALLY CONSISTENT SELF-SUPERVISED DEPTH AND EGO-MOTION LEARNING

(71) Applicant: TOYOTA RESEARCH INSTITUTE, INC., Los Altos, CA (US)

(72) Inventors: Takayuki Kanai, Los Altos, CA (US); Vitor Campagnolo Guizilini, Santa Clara, CA (US); Rares A. Ambrus, San Francisco, CA (US); Adrien Gaidon, San Jose, CA (US); Igor Vasiljevic, San Mateo, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 18/469,373

(22) Filed: Sep. 18, 2023

(65) Prior Publication Data
US 2025/0095380 A1  Mar. 20, 2025

(51) Int. Cl.
G06V 20/56 (2022.01)
B60W 40/105 (2012.01)

(52) U.S. Cl.
CPC ........... *G06V 20/56* (2022.01); *B60W 40/105* (2013.01); *B60W 2420/403* (2013.01)

(58) Field of Classification Search
CPC .............. G06V 20/56; B60W 40/105; B60W 2420/403
See application file for complete search history.

(56) References Cited

U.S. PATENT DOCUMENTS 11,157,774 B2 * 10/2021 Dudzik ................. G01S 7/4808
11,418,773 B2 *  8/2022 Arbabian ............... G06F 16/55
(Continued)

OTHER PUBLICATIONS

Guizilini et al., "3D Packing for Self-Supervised Monocular Depth Estimation," Proceedings of the IEEE/CVF Conference on Computer Vision and Pattern Recognition (CVPR), Jun. 16, 2020. pp. 2485-2494 (https://openaccess.thecvf.com/content_CVPR_2020/papers/Guizilini_3D_Packing_for_Self-Supervised_Monocular_Depth_Estimation_CVPR_2020_paper.pdf).
(Continued)

*Primary Examiner* — Gregory M Desire
(74) *Attorney, Agent, or Firm* — SHEPPARD, MULLIN, RICHTER & HAMPTON LLP; Daniel N. Yannuzzi

(57) ABSTRACT

Systems and methods described herein relate to self-supervised scale-aware learning of camera extrinsic parameters. One embodiment processes instantaneous velocity between a target image and a context image captured by a first camera; jointly training a depth network and pose network based on scaling by the instantaneous velocity; produce depth map using the depth network; produce ego-motion of the first camera using the pose network; generate synthesized image from the target image using a reprojection operation based on the depth map, the ego-motion, the context image and camera intrinsics; determine photometric loss by comparing the synthesized image to the target image; generate photometric consistency constraint using a gradient from the photometric loss; determine pose consistency constraint between the first camera and a second camera; and optimize the photometric consistency constraint, the pose consistency constraint, the depth network and the pose network to generate estimated extrinsic parameters.

20 Claims, 7 Drawing Sheets

(56) References Cited

U.S. PATENT DOCUMENTS

| | | | |
|---|---|---|---|
| 11,443,481 | B1* | 9/2022 | Yin ..................... G06T 7/529 |
| 11,494,927 | B2 | 11/2022 | Guizilini |
| 11,537,139 | B2* | 12/2022 | Rankawat ............ G05D 1/0088 |
| 12,045,950 | B2* | 7/2024 | Chakravarty ............ G06T 7/73 |
| 12,293,535 | B2* | 5/2025 | Kalra ................. G01B 11/245 |
| 12,333,760 | B1* | 6/2025 | Uguz ..................... G06V 10/82 |
| 12,387,353 | B2* | 8/2025 | Cole ....................... G06T 7/20 |
| 2023/0080638 | A1 | 3/2023 | Guizilini |

OTHER PUBLICATIONS

Fang et al., "Self-Supervised Camera Self-Calibration from Video," arXiv:2112.03325v2 [cs.CV], Mar. 1, 2022, 2022 International Conference on Robotics and Automation (ICRA), 8 pages (https://doi.org/10.1109/ ICRA46639.2022.9811784).

Zhao et al., "Geometry-Aware Symmetric Domain Adaptation for Monocular Depth Estimation," 2019 IEEE/CVF Conference on Computer Vision and Pattern Recognition (CVPR), Jun. 2019, pp. 9788-9798 (https://doi.org/10.1109/CVPR.2019.01002).

Gurram et al., "Monocular Depth Estimation through Virtual-world Supervision and Real-world SfM Self-Supervision," 2021 IEEE Transactions on Intelligent Transportation Systems, Oct. 12, 2021, 14 pages (https://arxiv.org/ abs/2103.12209).

Gong et al., "Self-Calibration Supported Robust Projective Structure-from-Motion," arXiv:2007.02045v1 [cs.CV], Jul. 4, 2020, 21 pages (https://doi.org/10.48550/arXiv.2007.02045).

Zhou et al., "Unsupervised Learning of Depth and Ego-Motion from Video," 2017 IEEE Conference on Computer Vision and Pattern Recognition (CVPR), Jul. 25, 2017, 10 pages (https://doi.org/10.48550/arXiv.1704.07813).

Shin et al., "Maximizing Self-supervision from Thermal Image for Effective Self-Supervised Learning of Depth and Ego-Motion," arXiv:2201.04387v2 [cs.RO], Jun. 15, 2022, 8 pages (https://doi.org/10.48550/arXiv.2201.04387).

Novotny et al., "Capturing the Geometry of Object Categories from Video Supervision," IEEE Transactions on Pattern Analysis and Machine Intelligence, Sep. 19, 2018, 42(2):261-275 (https://doi.org/10.1109/TPAMI.2018.2871117).

Jaderberg et al., "Spatial Transformer Networks," Advances in Neural Information Processing Systems 28 (NIPS 2015), Jun. 2015, 9 pages (https://proceedings.neurips.cc/paper_files/paper/2015/file/33ceb07bf4eeb3da587e268d663aba1a-Paper.pdf).

Gil et al., "MonSter: Awakening the Mono in Stereo," arXiv:1910.13708v1 [cs.CV], Oct. 30, 2019, 13 pages (https://doi.org/10.48550/arXiv.1910.13708).

Kanai et al., "Robust Self-Supervised Extrinsic Self-Calibration," arXiv: 2308.02153v2 [cs.CV], Aug. 7, 2023, 8 pages (https://doi.org/10.48550/arXiv.2308.02153).

* cited by examiner

SELF EXTRINSIC SELF-CALIBRATION VIA GEOMETRICALLY CONSISTENT SELF-SUPERVISED DEPTH AND EGO-MOTION LEARNING

TECHNICAL FIELD

The present disclosure relates generally to camera calibration, and in particular, some implementations may relate to methods and systems for camera self-supervised extrinsic calibration from image sequences that may be applied to a family of general camera models.

DESCRIPTION OF RELATED ART

Having access to accurate geometric information of the environment surrounding an autonomous system is critical for perception and planning tasks associated with autonomous driving. Cameras are small, lightweight, inexpensive, power efficient, and are able to capture rich information regarding scenes, such as scenes reflecting the surrounding environment, to provide an understanding of environments. Therefore, cameras are a key component for generating geometric information of environments for the field of autonomous driving, in addition to other fields such as robotics and computer vision algorithms.

BRIEF SUMMARY OF THE DISCLOSURE

According to various embodiments of the disclosed technology, systems and methods for a self-supervised self-calibration camera system are provided.

In accordance with some embodiments, a method for self-supervised scale-aware learning of camera extrinsic parameters is provided. The method comprises processing instantaneous velocity between a target image and a context image captured by a first camera; jointly training a depth network and pose network based on scaling by the instantaneous velocity, wherein the depth network produces predicted depth maps for the target image and the pose network predicts the relative rigid-body transformation between the target image and the context image; processing, using the depth network, the target image to produce a depth map; processing, using the pose network and the instantaneous velocity, the target image and the context image to produce an ego-motion of the first camera; generating a synthesized image from the target image using a reprojection operation based on the depth map, the ego-motion and the context image; determining photometric loss by comparing the synthesized image to the target image; generating photometric consistency constraint using a gradient from the photometric loss; determining pose consistency constraint between the first camera and a second camera; and optimizing the photometric consistency constraint, the pose consistency constraint, the depth network and the pose network to generate estimated extrinsic parameters.

In some embodiments, the method further comprises regularizing the depth map to provide smoothing of depth estimations.

In some embodiments, the synthesized image is generated from the target image using the reprojection operation further based on camera intrinsics and the camera intrinsics are associated with a parametric camera model.

In some embodiments, the scaling by the instantaneous velocity is used to train the depth network to produce metrically accurate and scale-aware depth maps.

In some embodiments, the scaling by the instantaneous velocity is used to train the pose network to produce metrically accurate and scale-aware ego-motion.

In some embodiments, the determining pose consistency constraint between the first camera and a second camera comprises: processing, using the pose network and the instantaneous velocity, a second target image and a second context image to produce a second ego-motion, wherein the second target image and the second context image are captured by the second camera; converting the second ego-motion of the second camera to a coordinate frame of the first camera; in response to converting the second ego-motion to the coordinate frame of the first camera, constraining translation vectors of the first and second cameras to determine a translation consistency loss; in response to converting the second ego-motion to the coordinate frame of the first camera, converting rotation matrices of the first and second cameras to determine a rotation consistency loss; and determining a pose consistency loss by combining the translation consistency loss and the rotation consistency loss.

In some embodiments, the method further comprises training the depth network and the pose network according to the pose consistency loss to generate metrically accurate and scale-aware depth maps and ego-motion.

In some embodiments, the method further comprises receiving a first set of images captured by the first camera and a second set of images captured by the second camera; warping images between the first set and the second set; generating spatio-temporal contexts by processing the warped images across a spatial axis and a temporal axis; and jointly training the depth network and the pose network with the spatio-temporal contexts.

In some embodiments, the first camera and the second camera are rigged to a vehicle.

In some embodiments, the ego-motion of the first camera is identical to an ego-motion of the second camera.

In some embodiments, the method further comprises updating the camera intrinsics on a per-image sequence basis using the gradient from the photometric loss.

In another aspect, a system for self-supervised scale-aware learning of camera extrinsic parameters is provided that comprises one or more processors; and a memory communicably coupled to the one or more processors and including instructions. The one or more processors are configured to execute the instructions to process instantaneous velocity between a target image and a context image captured by a first camera; jointly train a depth network and pose network based on scaling by the instantaneous velocity, wherein the depth network produces predicted depth maps for the target image and the pose network predicts the relative rigid-body transformation between the target image and the context image; process, using the depth network, the target image to produce a depth map; process, using the pose network and the instantaneous velocity, the target image and the context image to produce an ego-motion of the first camera; generate a synthesized image from the target image using a reprojection operation based on the depth map, the ego-motion and the context image; determine photometric loss by comparing the synthesized image to the target image; generate photometric consistency constraint using a gradient from the photometric loss; determine pose consistency constraint between the first camera and a second camera; and optimize the photometric consistency constraint, the pose consistency constraint, the depth network and the pose network to generate estimated extrinsic parameters.

In some embodiments, the system further comprises instructions that cause the cause the one or more processors to regularize the depth map to provide smoothing of depth estimations.

In some embodiments, the synthesized image is generated from the target image using the reprojection operation further based on camera intrinsics and the camera intrinsics are associated with a parametric camera model.

In some embodiments, the scaling by the instantaneous velocity is used to train the depth network to produce metrically accurate and scale-aware depth maps.

In some embodiments, the scaling by the instantaneous velocity is used to train the pose network to produce metrically accurate and scale-aware ego-motion.

In some embodiments, the determine pose consistency constraint between the first camera and a second camera comprises: processing, using the pose network and the instantaneous velocity, a second target image and a second context image to produce a second ego-motion, wherein the second target image and the second context image are captured by the second camera; converting the second ego-motion of the second camera to a coordinate frame of the first camera; in response to converting the second ego-motion to the coordinate frame of the first camera, constraining translation vectors of the first and second cameras to determine a translation consistency loss; in response to converting the second ego-motion to the coordinate frame of the first camera, converting rotation matrices of the first and second cameras to determine a rotation consistency loss; and determining a pose consistency loss by combining the translation consistency loss and the rotation consistency loss.

In some embodiments, the system further comprises instructions that cause the cause the one or more processors to train the depth network and the pose network according to the pose consistency loss to generate metrically accurate and scale-aware depth maps and ego-motion.

In some embodiments, the system further comprises instructions that cause the cause the one or more processors to receive a first set of images captured by the first camera and a second set of images captured by the second camera; warp images between the first set and the second set; generate spatio-temporal contexts by processing the warped images across a spatial axis and a temporal axis; and jointly train the depth network and the pose network with the spatio-temporal contexts.

In some embodiments, the first camera and the second camera are rigged to a vehicle.

In some embodiments, the ego-motion of the first camera is identical to an ego-motion of the second camera.

In some embodiments, the system further comprises instructions that cause the cause the one or more processors to update the camera intrinsics on a per-image sequence basis using the gradient from the photometric loss.

In another aspect, a non-transitory machine-readable medium is provided. The non-transitory computer-readable medium includes instructions that when executed by a processor cause the processor to perform operations including processing instantaneous velocity between a target image and a context image captured by a first camera; jointly training a depth network and pose network based on scaling by the instantaneous velocity, wherein the depth network produces predicted depth maps for the target image and the pose network predicts the relative rigid-body transformation between the target image and the context image; processing, using the depth network, the target image to produce a depth map; processing, using the pose network and the instantaneous velocity, the target image and the context image to produce an ego-motion of the first camera; generating a synthesized image from the target image using a reprojection operation based on the depth map, the ego-motion and the context image; determining photometric loss by comparing the synthesized image to the target image; generating photometric consistency constraint using a gradient from the photometric loss; determining pose consistency constraint between the first camera and a second camera; and optimizing the photometric consistency constraint, the pose consistency constraint, the depth network and the pose network to generate estimated extrinsic parameters.

In some embodiments, the non-transitory machine-readable medium further comprises operations comprising regularizing the depth map to provide smoothing of depth estimations.

In some embodiments, the synthesized image is generated from the target image using the reprojection operation further based on camera intrinsics and the camera intrinsics are associated with a parametric camera model.

In some embodiments, the scaling by the instantaneous velocity is used to train the depth network to produce metrically accurate and scale-aware depth maps.

In some embodiments, the scaling by the instantaneous velocity is used to train the pose network to produce metrically accurate and scale-aware ego-motion.

In some embodiments, the determining pose consistency constraint between the first camera and a second camera comprises: processing, using the pose network and the instantaneous velocity, a second target image and a second context image to produce a second ego-motion, wherein the second target image and the second context image are captured by the second camera; converting the second ego-motion of the second camera to a coordinate frame of the first camera; in response to converting the second ego-motion to the coordinate frame of the first camera, constraining translation vectors of the first and second cameras to determine a translation consistency loss; in response to converting the second ego-motion to the coordinate frame of the first camera, converting rotation matrices of the first and second cameras to determine a rotation consistency loss; and determining a pose consistency loss by combining the translation consistency loss and the rotation consistency loss.

In some embodiments, the non-transitory machine-readable medium further comprises operations comprising training the depth network and the pose network according to the pose consistency loss to generate metrically accurate and scale-aware depth maps and ego-motion.

In some embodiments, the non-transitory machine-readable medium further comprises operations comprising: receiving a first set of images captured by the first camera and a second set of images captured by the second camera; warping images between the first set and the second set; generating spatio-temporal contexts by processing the warped images across a spatial axis and a temporal axis; and jointly training the depth network and the pose network with the spatio-temporal contexts.

In some embodiments, the first camera and the second camera are rigged to a vehicle.

In some embodiments, the ego-motion of the first camera is identical to an ego-motion of the second camera.

In some embodiments, the non-transitory machine-readable medium further comprises operations comprising updating the camera intrinsics on a per-image sequence basis using the gradient from the photometric loss.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
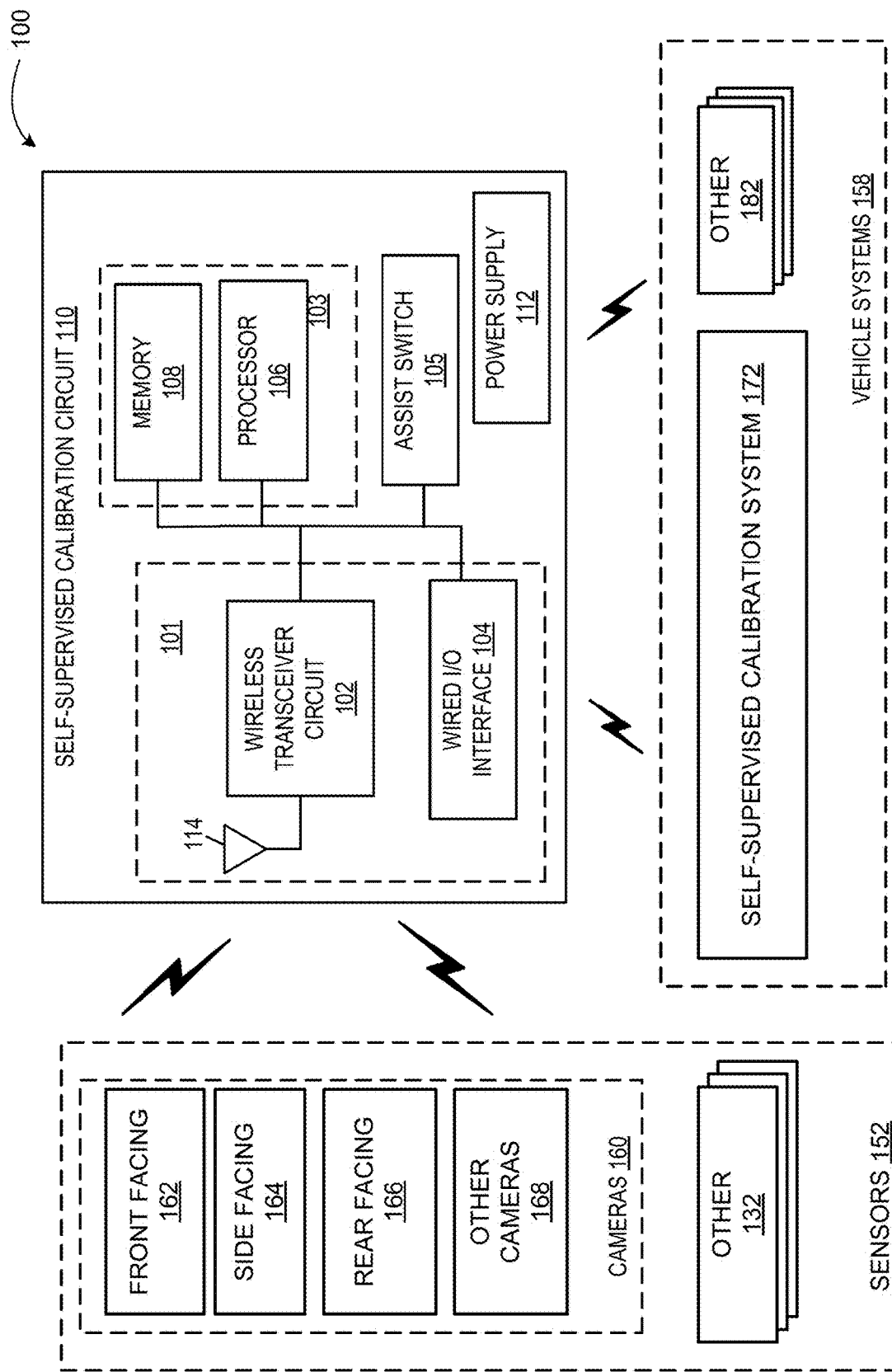
FIG. 1 illustrates an example architecture for self-supervised calibration in accordance with one embodiment of the systems and methods described herein.

The figures are not exhaustive and do not limit the present disclosure to the precise form disclosed.

DETAILED DESCRIPTION

Camera calibration is directed towards the tuning of camera characteristics. Specifically, the purpose of camera calibration is to remove distortions in images by tuning certain camera characteristics to optimize the relation between image pixels and real world dimensions so known targets can be perceived or sensed by a camera. When the targets are moved in a scene, and/or features relating to the scene, such as light sensitivity, geographical layout, colorization, etc. (hereinafter referred to as "camera parameters"), are changed, the camera's perception of the targets can be "checked" to determine if the camera is accurately perceiving and capturing the movement of the targets and the image of the entire scene. When a target or image of the scene is not accurately perceived and captured by the camera, camera calibration may be performed to tune characteristics of the camera until such target and/or camera parameters are accurately perceived and captured by the camera.

Camera calibration infers properties of a scene from visual input streams. Traditionally, however, calibration is labor intensive that relies on specialized data and a tedious manual tuning process. Typically, calibration requires collecting images of known targets as they are deliberately moved in a scene. The tuning process must be repeated every time camera parameters change. In several key applications, including mobile robots and autonomous vehicles, camera parameters may change frequently.

Some camera calibration methods perform calibration "in the wild," meaning without reference to known targets. However, conventional camera calibration methods still require strong assumptions about the scene, such as, for example, the existence of vanishing points, which are not necessarily true in unstructured environments. A vanishing point may be a single point in an image where parallel lines converge to give the illusion of depth and it is created using the perception that objects appear gradually smaller the further they are from the camera's lens, eventually making the smallest objects in the distance seem to disappear altogether. This limits the accuracy and applicability of known "in the wild" calibration methods. Though accurate, these techniques require a controlled setting and manual target image capture for re-calibration.

Some camera calibration methods are learning-based. These methods reduce reliance on the problematic assumptions, discussed above, by regressing camera parameters directly from images. However, though these methods may achieve accurate depth and ego-motion, known learning-based methods suffer from two key defects. They are either overparameterized or they are limited to a pin-hole or near-pinhole camera model. For example, these methods may rely on synthetic data sets. Also, calibration methods based on the "high-order polynomial" distortion family, including pinhole radial distortion, omnidirectional, and Kannala Brandt models, require solving for the root of a high-order polynomial, typically performed by iterative optimization, which is difficult to differentiate and thus expensive.

Learning based-methods are either supervised or self-supervised. As discussed above, supervised methods typically rely on synthetic data or assumed parameters. However, known self-supervised methods also suffer from defects. Namely, existing methods learn calibration on a per-frame basis and do not offer a calibration evaluation of their learned camera model. These methods are also generally limited to lower resolutions.

Autonomous vehicles and robots may operate over widely varying terrains to complete tasks efficiently and safely. For example, using multi-camera self-supervised monocular depth estimation from visual data may be an efficient and effective way to understand the environment by generating metrically scaled geometric predictions from the visual data without requiring additional sensors. However, most works currently assume well-calibrated extrinsics of a camera to fully establish multi-camera setups as accurate and efficient calibrations are a challenging problem. Extrinsics of a camera may be external camera parameters used to describe the transformation between the camera and the real world.

To achieve the goal of dense depth prediction, self-supervised depth estimation methods are attractive because self-supervision is not restricted to high-quality labeled data, and can instead be trained on raw image sequences without ground-truth point cloud supervision. Dense depth prediction is directed towards the task of determining, estimating or predicting the distance of each pixel relative to a camera at any given moment. Accurate depth estimation may allow for accurate camera calibration to be performed by tuning characteristics of a camera to accurately perceive and capture a target and/or scene by the camera.

While multi-camera training does improve self-supervised learning, currently it still requires known extrinsics, which in turn requires laborious camera calibration that typically involve manual collection of images containing known calibration targets. Recent work has also shown that monocular intrinsics calibration may be achieved in a self-supervised way, though self-supervised architectures utilizing extrinsics still use ground-truth data.

As described above, the embodiments of the technology disclosed herein provide systems and methods configured to establish extrinsic parameter-based camera calibration that builds upon principles of self-supervised monocular depth and ego-motion learning. Utilizing pretrained scale-aware depth networks and a curriculum learning strategy, accurate and metrically-scaled extrinsics may be estimated from unlabeled image sequences, without expensive optimization or bundle adjustment that are used for standard extrinsic calibration pipelines. The pretrained scale-aware depth networks may be obtained using instantaneous velocity of a vehicle. As such, multiple multi-camera configurations may be simultaneously self-calibrated without the supervision of 3D sensors or any manual labor Example Implementation in Vehicle to Support Autonomous Driving The systems and methods disclosed herein may support autonomous driving applications. They may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well.

A vehicle in which the systems and methods disclosed herein may be implemented may include an electronic control unit (ECU). The ECU may include circuitry and/or components to initialize, control, and/or adjust implementations of the systems and methods disclosed herein. For example, the ECU may include a microcomputer that may further include processing units (e.g., microprocessors), memory storage (e.g., RAM, ROM, etc.), and I/O devices. Processing units of the ECU may execute instructions stored in memory to control one or more systems or subsystems in the vehicle. The ECU may include modules to control vehicle sensors, such as cameras. In an embodiment, the ECU may include a camera calibration module, a calibration training module, and/or a re-calibration module.

The ECU may, for example, receive information from a plurality of sensors in the vehicle. In an example embodiment, the sensors may be cameras. The ECU may receive raw video footage from the cameras. In some embodiments, sensors and/or camera systems may include their own processing capabilities to compute the results for additional information that can be provided to the ECU. For example, camera systems may determine intrinsic and extrinsic camera parameters. Intrinsic camera parameters may be the parameters needed to match pixel coordinates of an image with corresponding coordinates in a camera reference frame. Intrinsic parameters may represent the optics of a camera model and give projection, and unprojection, and distortion of a camera model. Extrinsic camera parameters may be parameters referring to the poses of a camera on a rig with respect to a vehicle coordinate frame.

The determined intrinsic and extrinsic parameters may be provided to the ECU for camera calibration and/or re-calibration. In other embodiments, sensors and/or camera systems may be data-gathering-only sensors that provide only raw data to the ECU. For example, in an embodiment, cameras may collect raw video footage. The ECU may, for example process the footage to compete camera parameters. In further embodiments, hybrid sensors and/or camera systems may be included that provide a combination of raw data and processed data to the ECU.

The foregoing description provides examples of vehicle systems with which embodiments of the disclosed technology may be implemented. One of ordinary skill in the art reading this description will understand how the disclosed embodiments can be implemented with vehicle platforms.

FIG. 1 illustrates an example self-supervised calibration architecture for camera systems implemented in a vehicle in accordance with one embodiment of the systems and methods described herein. Referring now to FIG. 1, in this example, self-supervised calibration system 100 includes a self-supervised calibration circuit 110, a plurality of sensors 152, and a plurality of vehicle systems 158. Sensors 152 and vehicle systems 158 can communicate with self-supervised calibration circuit 110 via a wired or wireless communication interface. Although sensors 152 and vehicle systems 158 are depicted as communicating with self-supervised calibration circuit 110, they can also communicate with each other as well as with other vehicle systems. Self-supervised calibration circuit 110 can be implemented as an ECU or as part of an ECU. In other embodiments, self-supervised calibration circuit 110 can be implemented independently of the ECU.

Self-supervised calibration circuit 110 in this example includes a communication circuit 101, a decision circuit (including a processor 106 and memory 108 in this example) and a power supply 112. Components of self-supervised calibration circuit 110 are illustrated as communicating with each other via a data bus, although other communication in interfaces can be included. Self-supervised calibration circuit 110 in this example also includes a manual switch 105 that can be operated by the user to manually select the calibration mode.

Processor 106 can include a GPU, CPU, microprocessor, or any other suitable processing system. The memory 108 may include one or more various forms of memory or data storage (e.g., flash, RAM, etc.) that may be used to store the calibration parameters, images (analysis or historic), point parameters, instructions and variables for processor 106 as well as any other suitable information. Memory 108, can be made up of one or more modules of one or more different types of memory, and may be configured to store data and other information as well as operational instructions that may be used by the processor 106 to self-supervised calibration circuit 110.

Although the example of FIG. 1 is illustrated using processor and memory circuitry, as described below with reference to circuits disclosed herein, decision circuit 103 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a self-supervised calibration circuit 110.

Communication circuit 101 may include either or both a wireless transceiver circuit 102 with an associated antenna 114 and a wired I/O interface 104 with an associated hardwired data port (not illustrated). As this example illustrates, communications with self-supervised calibration circuit 110 can include either or both wired and wireless communications circuits 101. Wireless transceiver circuit 102 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 114 is coupled to wireless transceiver circuit 102 and is used by wireless transceiver circuit 102 to transmit radio signals wirelessly to wireless equipment with which it is connected and to receive radio signals as well. These RF signals can include information of almost any sort that is sent or received by self-supervised calibration circuit 110 to/from other entities such as sensors 152 and vehicle systems 158.

Wired I/O interface 104 can include a transmitter and a receiver (not shown) for hardwired communications with other devices. For example, wired I/O interface 104 can provide a hardwired interface to other components, including sensors 152 and vehicle systems 158. Wired I/O interface 104 can communicate with other devices using Ethernet or any of a number of other wired communication protocols whether standardized, proprietary, open, point-to-point, networked or otherwise.

Power supply 110 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 may include any types of sensors with which a vehicle may be equipped. As illustrated in the example in FIG. 1, sensors 152 include cameras 160 and other sensors 132. Cameras 160 include a front facing cameras 162, side facing cameras 164, rear facing cameras 166, and other cameras 168. Other sensors 132 may be included as may be appropriate for a given implementation of a self-supervised calibration circuit 110. Vehicle systems 158 can include any of a number of different vehicle components or subsystems used to control or monitor various aspects of the vehicle and its performance. In this example, the vehicle systems 158 include a self-supervised calibration system 172 and other vehicle systems 182.

During operation, self-supervised calibration circuit 110 can receive information from various vehicle sensors to determine whether the calibration mode should be activated. For example, the calibration mode may be activated if sensors determine there is a detected decline or shift in accuracy and/or performance of the vehicle's camera system. Calibration mode may be activated automatically upon detection of such a decline and/or shift. Additionally, calibration mode be activated at set intervals to preserve accurate calibration and prevent a shift or decline in performance. Also, the driver may manually activate the calibration mode by operating assist switch 105. Communication circuit 101 can be used to transmit and receive information between self-supervised calibration circuit 110 and sensors 152, and self-supervised calibration circuit 110 and vehicle systems 158. Also, sensors 152 may communicate with vehicle systems 158 directly or indirectly (e.g., via communication circuit 101 or otherwise).

In various embodiments, communication circuit 101 can be configured to receive data and other information from sensors 152 that is used in determining whether to activate the calibration mode. Additionally, communication circuit 101 can be used to send an activation signal or other activation information to various vehicle systems 158 as part of entering the calibration mode. For example, as described in more detail below, communication circuit 101 can be used to send signals to, for example, self-supervised camera calibration system 172 to initialize calibration of one or more camera systems of the vehicle such as cameras 160. The decision regarding what action to take via these various vehicle systems 158 can be made based on the information detected by sensors 152, including cameras 160. Examples of this are described in more detail below.

Though the preceding paragraphs describe examples of how a self-supervised camera calibration systems or method may be implemented within a vehicle, the embodiments are not limiting. Self-supervised calibration systems and methods in accordance with the embodiments described herein may be implemented with any camera or camera systems whether included in a vehicle or not. For example, self-supervised calibration systems and methods as described herein may be implemented in a non-vehicle robot. Other implementations are also possible.

Scale-Aware Pretraining

In an embodiment, self-calibration of a camera system is achieved using only image sequences. A self-supervised monocular depth learning framework may be used as a proxy for self-calibration. Self-supervised depth and ego-motion ($\hat{X}^{t \to c}$) architectures may include a depth network. The depth network may produce a depth map ($\hat{D}_t$) for a target image ($I_t$) by generating depth models that predict depth for every pixel p in the target image ($I_t$). The architectures may also include a pose network. A pose may refer to the motion of the vehicle and the pose network may predict an ego-motion of the relative rigid-body transformation between the frames of the target image ($I_t$) and a context image ($I_c$): $\hat{X}^{t \to c} = (\hat{R}_0^{t \to c} \hat{t}_1^{t \to c}) \in SE(3)$. The context image ($I_c$) typically precedes or follows the target image ($I_t$) in a sequence, such as where target image ($I_t$) and context image ($I_c$) are consecutive images in a set of source images ($I_S$).

Introducing velocity supervision at training may produce scale-aware depth and pose networks. Instantaneous velocity measurements may be directly incorporated in the self-supervised training objective $\mathcal{L}(I_t, \hat{I}_t)$ to learn a metrically accurate and scale-aware monocular depth map. During training of the depth and pose networks, an additional loss ($\mathcal{L}_v$) may be imposed between the magnitude of the pose-translation component of the pose network prediction ($\hat{t}$) and the measured instantaneous velocity scalar (v) multiplied by the time difference between target and source frames $\Delta T_{t \to s}$, shown by:

$$\mathcal{L}_v(\hat{t}_{t \to s}, v) = |\,\|\hat{t}_{t \to s}\| - |v|\Delta T_{t \to s}\,|$$

A final scale-aware self-supervised objective loss ($\mathcal{L}_{scale}$) may be generated using the measured instantaneous velocity scalar (v) between the actual target image ($I_t$) and a synthesized image ($\hat{I}_t$), shown by:

$$\mathcal{L}_{scale}(I_t, \hat{I}_t, v) = \mathcal{L}(I_t, \hat{I}_t) + \lambda_2 \mathcal{L}_v(\hat{t}_{t \to s}, v)$$

where $\lambda_2$ may be a weight used to balance the different loss terms. The additional velocity loss may allow the pose network to make metrically accurate predictions subsequently, which may result in a depth network also learning metrically accurate estimates to maintain consistency. The introduction of velocity supervision at training may also allow the generation of scale-aware depth maps with the benefit of not requiring ground-truth depth scaling during testing. Further, using velocity supervision at training may also allow for the composition of metrically accurate trajectories directly from the output of the pose network.

Photometric Pretraining

The depth and pose networks may be trained jointly in a self-supervised manner. Training the networks jointly may minimize the reprojection error between the actual target image ($I_t$) and a synthesized image ($\hat{I}_t$). The synthesized image ($\hat{I}_t$) may be generated by reprojection using the predicted depth map ($\hat{D}_t$), ego-motion ($\hat{X}^{t \to c}$), an assumed camera intrinsics ($K_t$) and the context image ($I_c$). The photometric reprojection error may be given by:

$$\mathcal{L}_p(I_t, \hat{I}_t) = \alpha \frac{1 - SSIM(I_t, \hat{I}_t)}{2} + (1 - \alpha)\|I_t - \hat{I}_t\|$$

where $\mathcal{L}_p(I_t, \hat{I}_t)$ represents the photometric reprojection loss and SSIM may be a measurement of the structural similarity between two images. The photometric reprojection error may provide the photometric consistency constraint used to generate a self-supervised training objective $\mathcal{L}(I_t, \hat{I}_t)$.

While multi-view projective geometry may provide strong cues for self-supervision, errors due to parallax in the scene may have undesirable effect incurred on the photometric reprojection $\mathcal{L}_p(I_t, \hat{I}_t)$. To mitigate any undesirable effects, the minimum photometric loss per pixel for each source image in a set of source images ($I_S$) may be calculated by:

$$\mathcal{L}_p(I_t, I_S) = \min_{I_s} \mathcal{L}_p(I_t, \hat{I}_t)$$

where the same pixel may not be occluded or out-of-bounds in all source images ($I_S$), and the association with minimal photometric loss may be accurate. A static pixel may be masked out ($M_p$) when it has a warped photometric loss $\mathcal{L}_p(I_t, \hat{I}_t)$ that is higher than its corresponding unwarped photometric loss $\mathcal{L}_p(I_t, I_S)$, which may be calculated using the original source image without view synthesis. Static pixels may also be masked out ($M_p$) when the pixel's appearance does not change between frames, including static scenes and dynamic objects with no relative motion which may have a smaller photometric loss when assuming no ego-motion.

A depth map ($\hat{D}_t$) may be regularized in texture-less low-image gradient regions by incorporating a regularization term to the reprojection error equation. The depth regularization ($\mathcal{L}_s$) used to regularize the depth map ($\hat{D}_t$) may be weighted for each of the pyramid-levels, and may decay by a factor of 2 on down-sampling, starting with a weight of 1 for the $0^{th}$ pyramid level. The equation for depth regularization ($\mathcal{L}_s$) may be $$\mathcal{L}_s(\hat{D}_t) = |\delta_x \hat{D}_t| e^{-|\delta_x I_t|} + |\delta_y \hat{D}_t| e^{-|\delta_y I_t|}$$

The self-supervised training objective $\mathcal{L}(I_t, \hat{I}_t)$ may consist of an appearance matching loss term $\mathcal{L}_m$ that is imposed between the target image ($I_t$) and the synthesized target image ($\hat{I}_t$), and a depth regularization ($\mathcal{L}_s$) that ensures edge-aware smoothing in the predicted depth maps ($\hat{D}_t$), as given by:

$$\mathcal{L}(I_t, \hat{I}_t) = \mathcal{L}_p(I_t, I_S) \odot \mathcal{M}_p \odot \mathcal{M}_t + \lambda_1 \mathcal{L}_s(\hat{D}_t)$$

where $\mathcal{M}_t$ may be a binary mask that avoids computing the photometric loss on the pixels that do not have a valid mapping and $\odot$ denotes element-wise multiplication. The $\lambda_1$ may enforce a weighted depth regularization on the objective. The overall loss of the self-supervised training objective $\mathcal{L}(I_t, \hat{I}_t)$ may be averaged per-pixel, pyramid-scale and image batch during training.

The target image and synthesized image may be compared to determine photometric loss. Gradients from the photometric loss may be used to update the camera intrinsic parameters. Gradients from the photometric loss may be used to provide a photometric consistency constraint which may be used to generate a self-supervised training objective.

Figure 2:
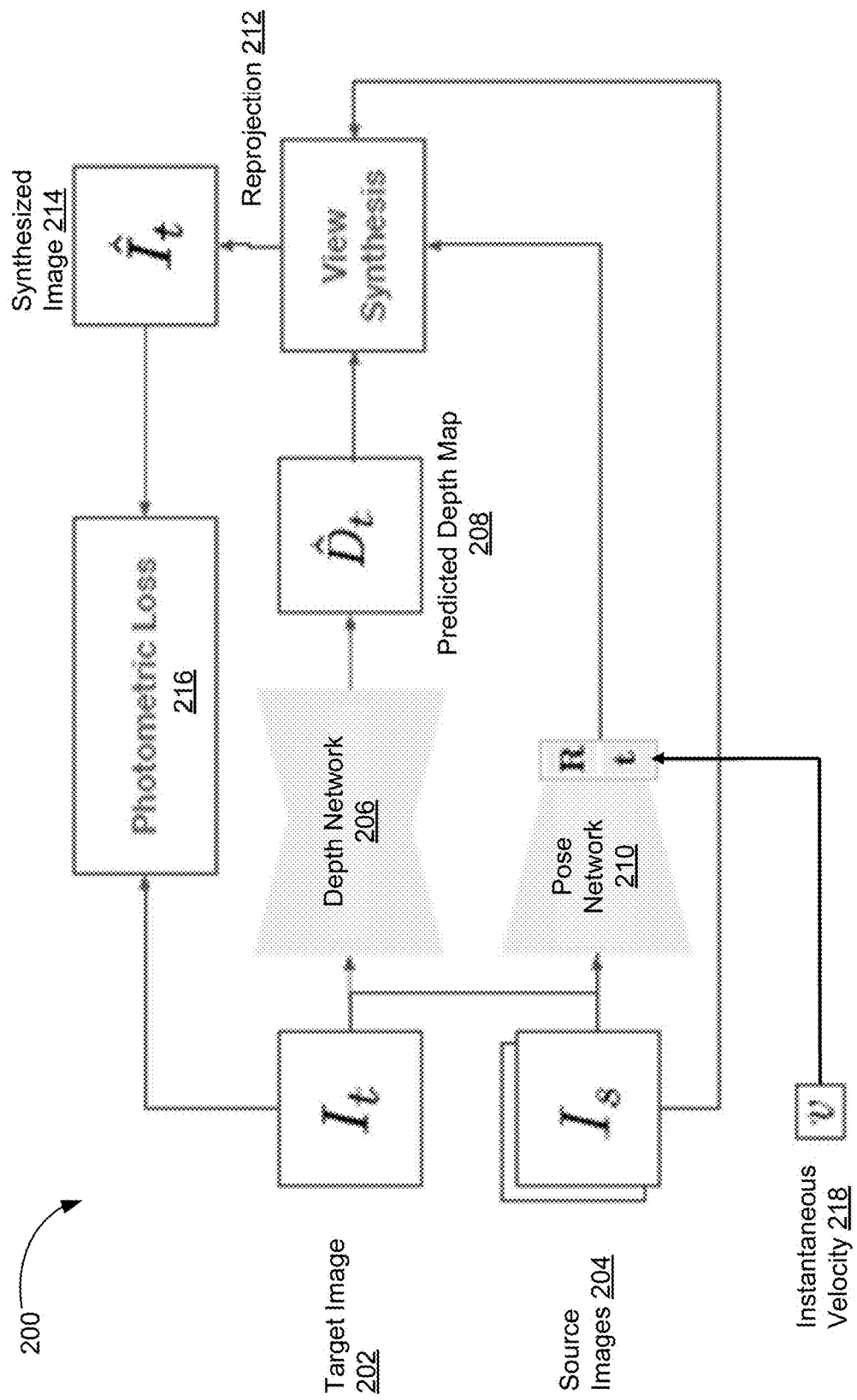
FIG. 2 is an example of an aspect of a self-supervised camera calibration system in accordance with the embodiments disclosed herein.

FIG. 2 illustrates an example of a self-supervised monocular depth and pose estimation. As illustrated in FIG. 2, self-supervised depth and ego-motion architectures 200 are shown. The self-supervised depth and ego-motion architectures 200 may include a predicted depth network 206. The predicted depth network 206 may predict a depth map 208 for a target image 202. The target image 202 may be captured by a camera. The self-supervised depth and ego-motion architectures 200 may also include a predicted pose network 210. The predicted pose network 210 may predict a relative rigid-body transformation between the target image 202 and a context image. The context image may be an image from the source images 204. The context image may precede or follow the target image in a sequence. The target image 202 may be a first image of the source images 204. The predicted pose network 210 may predict ego-motion.

The predicted depth network 206 may be used to generate a predicted pointcloud. The predicted pointcloud may be a set of 3D points assuming an estimated depth based on the predicted depth network 206. The predicted pose network 210 may, via application of a pixel warping function, generate a warped pointcloud from the predicted pointcloud. The warped pointcloud may be an estimated set of 3D points based on the predicted depth network 206, the predicted pose network 210, and camera intrinsic parameters. As such, a pixel warping function may take into account both the predicted pose network 210 as well as camera intrinsic parameters modeling the geometry of the camera. The camera intrinsic parameters may be necessary to determine both projection and unprojection of the predicted pointcloud. The camera intrinsic parameters may be assumed. The camera intrinsic parameters may be provided for the camera. The camera intrinsic parameters may be based on a parametric camera model.

The depth network 208 and pose networks 210 may be trained jointly by minimizing a reprojection error between the target image 202 and a synthesized image 214. The target image 202 may be synthesized from the context image from the source images 204 using the warped pointcloud to generate the synthesized image 214. The warped pointcloud is based on the jointly trained predicted depth map 206 and predicted pose network 210, the predicted pose network 210 predicting the ego motion, as well as camera intrinsic and extrinsic parameters. The synthesized image 214 may be generated by reprojection 212 from the context image onto the target image 202 using the predicted depth map 208, the predicted pose network 210 and the camera intrinsic parameters, the predicted pose network 210 predicting the ego-motion.

The target image 202 and synthesized image 214 may be compared to determine photometric loss 216. Gradients from the photometric loss 216 may be used to update the camera intrinsic parameters. In this way, the camera intrinsic parameters initially included in the pixel warping function may ultimately converge to accurate values giving the actual camera model. Gradients from the photometric loss 216 may be used to provide a photometric consistency constraint which may be used to generate a self-supervised training objective.

Instantaneous velocity 218 may be measured between the target image 202 and the context image from the source images 204. The instantaneous velocity 218 may be scaled and incorporated to the self-supervised training objective. The self-supervised training objective may be used to produce a scale-aware depth network and a scale-aware pose network. The scale-aware depth network may be an updated version of the depth network 206. The scale-aware pose network may be an updated version of the pose network 210. The scale-aware depth network may produce metrically accurate and scale-aware depth maps. The metrically accurate and scale-aware depth maps may be an updated version of the predicted depth map 208. The scale-aware pose network may produce metrically accurate and scale-aware ego-motion. The introduction of velocity supervision at training may also allow the generation of scale-aware depth maps with the benefit of not requiring ground-truth depth scaling during testing. Further, using velocity supervision at training may also allow for the composition of metrically accurate trajectories directly from the output of the pose network 210.

Figure 3:
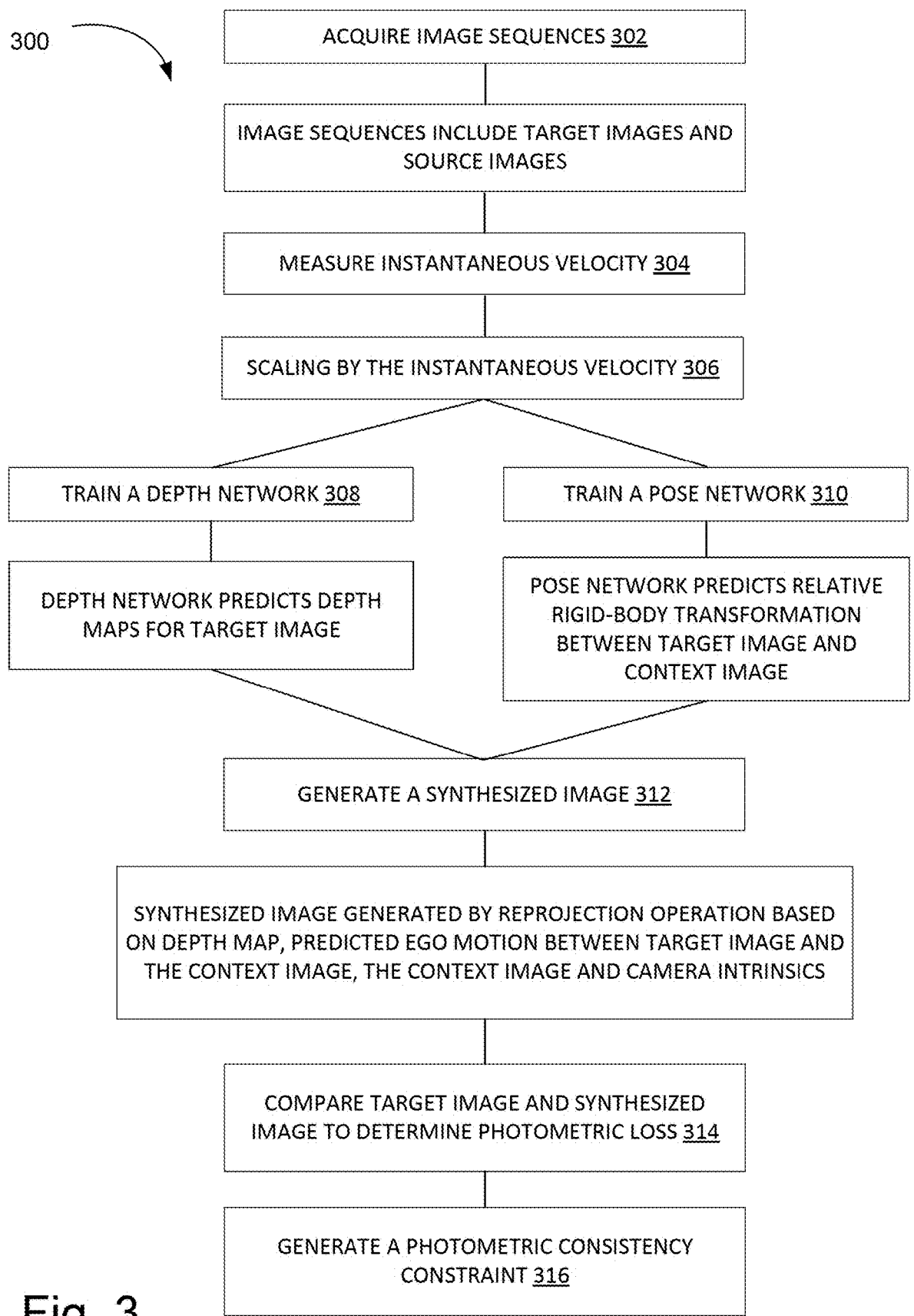
FIG. 3 is a flow diagram illustrating an example of a method for scale-aware and photometric training a self-supervised camera calibration system in accordance with the embodiments disclosed herein.

Referring now to FIG. 3, a flow diagram showing an example of a method for scale-aware and photometric training a self-supervised camera calibration system 300 in accordance with the embodiments disclosed herein is shown. A first operation 302 may include acquiring image sequences. Image sequences may be raw video data. The image sequences may include target images 202 and source images 204 that include a context image. A second operation 304 may include measuring instantaneous velocity 218 between the target image 202 and the context image from the source images 204. A third operation 306 may include performing scaling by the instantaneous velocity 218.

A fourth operation 308 may include training a depth network 206. The depth network 206 may predict depth maps 208 for target image 202. Concurrently with the fourth operation, a fifth operation 310 may include training a pose network 210. The pose network 210 may predict the relative rigid-body transformation between the target image 202 and the context image from the source image 204. The pose network 210 may predict ego-motion between the target image 202 and the context image from the source image 204.

A sixth operation 312 may include generating a synthesized image 214. A synthesized image 214 may be generated by using a reprojection operation 212 based on the depth map 208, ego-motion, the context image and camera intrinsics. A seventh operation 314 may include comparing the target image 202 and the synthesized image 214 to determine photometric loss 216. A eighth operation 316 may include using gradients from the photometric loss 216 to generate a photometric consistency constraint. The photometric consistency constraint may be used to generate a self-supervised training objective. The self-supervised training objective may be used to produce a scale-aware depth network and a scale-aware pose network.

Multi-Camera Pose Consistency Pretraining

For a multi-camera setting, spatio-temporal contexts (STC) may be defined via photometric consistency between reprojected camera images across spatial axis (i.e., between different cameras) as well as temporal axis (i.e., between different timesteps). For any given camera ($C_i$) in a multi-camera setting at a given timestep, a context image can be either temporal (i.e., from adjacent images t−1 and t+1) or spatial (i.e., from any camera $C_j$ that overlaps with $C_i$). This may allow a concept of context image in self-supervised learning to also include temporal contexts from other overlapping cameras by warping images between different cameras taken at different timesteps using a composition of known extrinsics with predicted ego-motion, as given by:

$$\hat{p}_i^t = \pi_2\left(R_{i \to j}\left(\hat{R}_j^{t \to c}\phi_j\left(p_j^t \hat{d}_j^t\right) + \hat{t}_j^{t \to c}\right) + t_{i \to j}\right)$$

Spatio-temporal contexts (STC) may promote a larger overlap between cameras and smaller residual photometric loss, due to occlusions and changes in brightness and viewpoint. Such improvements in photometric loss may lead to better self-supervision for depth and ego-motion learning in a multi-camera setting.

In addition to constraints across cameras due to image overlap, natural pose constraints may be determined due to multiple cameras being used in a multi-camera setting, with each camera rigidly attached to a single vehicle (i.e., relative camera extrinsics may be constant and fixed). Specifically, the pose network may be used to predict independent poses for each camera in a multi-camera setting, regardless if all cameras should correspond to the same transformation but in a different coordinate frame.

For a given camera ($C_i$), the pose network may predict its ego-motion transformation $\hat{X}_i^{t \to \tau}$ from the current image frame (t) to a temporally adjacent frame ($\tau$), where $\tau=\{t-1, t+1\}$. It may be assumed that all cameras in a multi-camera setting are rigidly attached to the vehicle, where the motion of each camera may be consistent when observed from the vehicle coordinate system, i.e., the motion of the vehicle estimated from t→$\tau_i$ in camera $C_L$ may be the same as the motion observed in camera $C_j$. To obtain predictions from different cameras that are in the same coordinate frame, the prediction of $\hat{X}_i^{t \to \tau}$ may be transformed to the coordinate frame of another camera ($C_j$), such that $\hat{X}_i^{t \to \tau}$ in $C_j$ coordinates may be $\hat{X}_i^{t \to \tau}$. To convert a predicted transformation $\hat{X}_i^{t \to \tau}$ from the coordinate frame of camera $C_i$ to camera $C_j$, and using extrinsics $X_i$ and $X_j$ to generate the pose prediction $\tilde{X}_i^{t \to \tau}$, may be given by: $\tilde{X}_i^{t \to \tau} = X_j^{-1} X_i \hat{X}_i^{t \to \tau} X_i^{-1} X_j$ As a convention, all predicted transformations may be converted to the coordinate frame of a front camera $C_1$. Once all predictions are in the same coordinate frame, the translations vectors (t) and rotation matrices ($\mathcal{R}$) may be constrained to be similar across all cameras. First, all predicted translation vectors (t) may be constrained to be similar to the prediction of the front camera $C_1$. By having the predicted front camera translation vector be $\tilde{t}_i^{t \to \tau}$, the translation consistency loss for N cameras may be given by:

$$t_{loss} = \sum_{j=2}^{N} \left\| \hat{t}_1^{t+1} - \tilde{t}_j^{t+1} \right\|^2$$

Next, other cameras may need to be constrained to predict a rotation matrix similar to the front camera $C_1$. This may be accomplished by converting the predicted translation vectors to Euler angles ($\phi_i$, $\theta_i$, $\psi_i$) once the predictions are in the same coordinate frame, and determining a rotation consistency loss, which may be given by:

$$\mathcal{R}_{loss} = \sum_{j=2}^{N} \|\hat{\phi}_1 - \tilde{\phi}_j\|^2 + \|\hat{\theta}_1 - \tilde{\theta}_j\|^2 + \|\hat{\psi}_1 - \tilde{\psi}_j\|^2$$

With there being inconsistency in the pose predictions, a pose consistency loss may be determined as the weighted sum of pair-wise translation and rotation errors of $\mathcal{L}_{pcc} = \alpha_t t_{loss} + \alpha_r \mathcal{R}_{loss}$, where $\alpha_t$ and $\alpha_r$ are respectively the translation and rotation weighting parameters. The complete equation for pose consistency loss may be given by:

$$\mathcal{L}_{pcc}\left(\hat{X}_i^{t \to \tau}, \tilde{X}_i^{t \to \tau}\right) = \sum_{\tau} \sum_{j=2}^{N} \left\{ \alpha_t \mathcal{L}_t\left(\hat{t}_1^{t \to \tau}, \tilde{t}_j^{t \to \tau}\right) + \alpha_r \mathcal{L}_R\left(\hat{R}_1^{t \to \tau}, \tilde{R}_j^{t \to \tau}\right) \right\}$$

For fully-calibrated settings in full surround monodepth (FSM), consistency constraint may be used to improve the predictions of the pose network, thus improve alignment between depth maps. The pose consistency constraint may dictate the pose network to produce predicted ego-motion to be the same across all cameras in a multi-camera setting, enforcing the learning of smaller rigid motion for all cameras.

In an embodiment, the pose predictions coming from synchronized video streams from cameras $C_i$ and $C_j$ on the rig may be identical, and by assuming known extrinsics of $X_i$ and $X_j$ for cameras $C_i$ and $C_j$, respectively, then the predicted transformation in coordinate frame of camera $C_j$ will equal the predicted transformation in coordinate frame of cameras $C_i$, $\tilde{X}_i^{t \to \tau} = \hat{X}_i^{t \to \tau}$.

Extrinsics Learning and Estimation

The pose consistency constraint may be a differentiable constraint on the extrinsic parameters and used as a learning guide to estimate extrinsics of cameras. By using a training scenario where the predicted pose $\hat{R}_j^{t \to \tau} \approx 1$ and $$\hat{X}_J = \begin{pmatrix} \hat{R}_i & \hat{t}_i \\ 0 & 1 \end{pmatrix}$$

$\in SE(3)$, then inserting the equation of pose prediction $\tilde{X}_i^{t \to \tau}$ into the equation for pose consistency loss $\mathcal{L}_{pcc}(\hat{X}_i^{t \to \tau}, \tilde{X}_i^{t \to \tau})$ may provide:

$$\mathcal{L}_r\left(\hat{t}_1^{t \to \tau}, \tilde{t}_j^{t \to \tau}\right) \approx \mathcal{L}_t\left(\hat{t}_1^{t \to \tau}, \hat{R}_j^{-1} \hat{t}_j^{t \to \tau}\right)$$

$$\mathcal{L}_R\left(\hat{R}_1^{r \to \tau}, \tilde{R}_j^{r \to \tau}\right) \approx \mathcal{L}_R\left(1, \hat{R}_j^{-1} \overline{R}_i\right)$$

where the rotation matrices are represented as Euler angles such that $\hat{R}(\phi, \theta, \psi) \widehat{R_x}(\phi) \widehat{R_y}(\theta) \widehat{R_z}(\psi)$.

According to the approximation for the translation error, if the ego-motion is only composed of forward or backward motion (giving $\hat{t}_1^{t \to \tau} \approx (0, 0, const.)^T$), and the camera $C_j$ is looking backwards relatively to camera $C_i$ (which may gives $\hat{t}_1^{t \to \tau} \approx (0, 0, -const.)^T$), then the above approximation may show that there is no useful gradient for $\psi$. Thus, the Euler angles may be $(\phi, \theta, \psi) = (\pi, 0, \pi)$ only for the initialization of the back-looking camera, and the Euler angles may be set at $(\phi, \theta, \psi) = 0$ for the remaining cameras.

Optimizing the photometric consistency constraint and the pose consistency constraint with the instantaneous velocity measurements may generate a self-supervised training objective to further improve depth estimation and predicted ego-motion. The self-supervised training objective may be incorporated into the training of the depth network and pose network, producing a scale-aware depth network and a scale-aware pose network. The scale-aware depth and pose networks may be able to estimate accurate, metrically-scaled extrinsics from raw, unlabeled image and video sequences. Moreover, with the self-supervised training objective being used to accurately update the scale-aware depth and pose networks, the system may simultaneously self-calibrate hundreds of multi-camera configurations, without depending on the supervision of additional 3D sensors or any manual labor.

Figure 4:
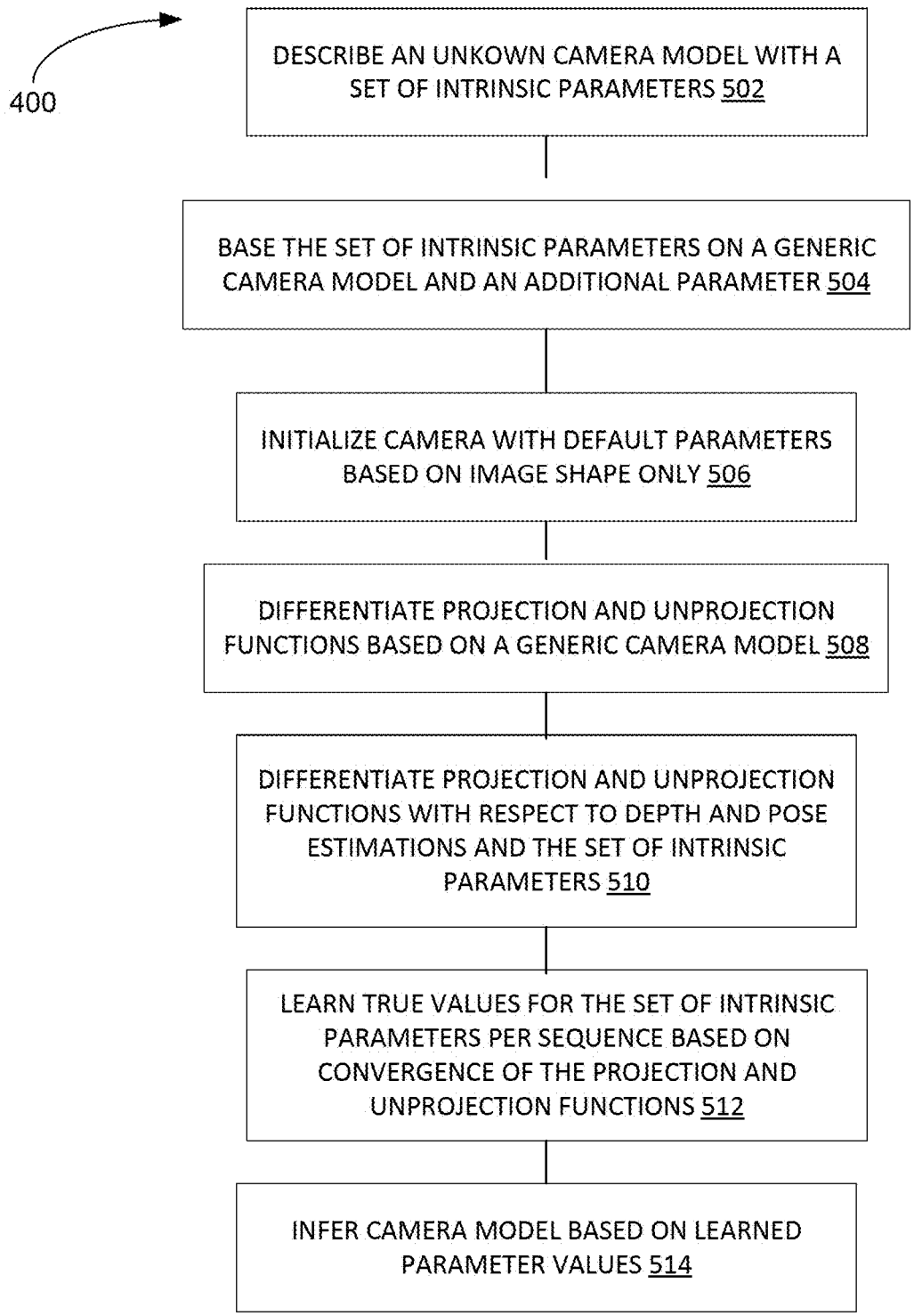
FIG. 4 is a flow diagram illustrating an example of a method for pose consistency training a self-supervised camera calibration system in accordance with the embodiments disclosed herein.

Referring now to FIG. 4, a flow diagram showing an example of a method for pose consistency training a self-supervised camera calibration system 400 in accordance with the embodiments disclosed herein is shown. A first operation 402 may include acquiring a plurality of images captured by a plurality of cameras. The plurality of cameras may each be rigged to a vehicle. Each of the plurality of cameras may capture at least one image of the plurality of images. A second operation 404 may include processing each of the plurality of images using a pose network to produce a plurality of ego-motions. Each image that is processed using the pose network may produce a respective ego-motion associated with that particular image.

A third operation 406 may include converting each of the plurality of ego-motions to a coordinate frame of a first camera of the plurality of cameras. Converting each ego-motion to a single coordinate frame of a single camera may allow all of the translation vectors of each camera to be constrained. Converting each ego-motion to a single coordinate frame of a single camera may allow all of the rotation matrices of each camera to be constrained.

A fourth operation 408 may include determining a translation consistency loss by constraining translation vectors across all of the plurality of cameras. A fifth operation 410 may include determining a rotation consistency loss across all of the plurality of cameras. A sixth operation 412 may include determining a pose consistency loss by combining the translation consistency loss and the rotation consistency loss. The pose consistency loss may be used to improve the predictions of the pose network that are more metrically accurate. The pose consistency loss may also influence the pose network to produce predicted ego-motion that is the same across all of the plurality of cameras in a multi-camera setting.

Figure 5:
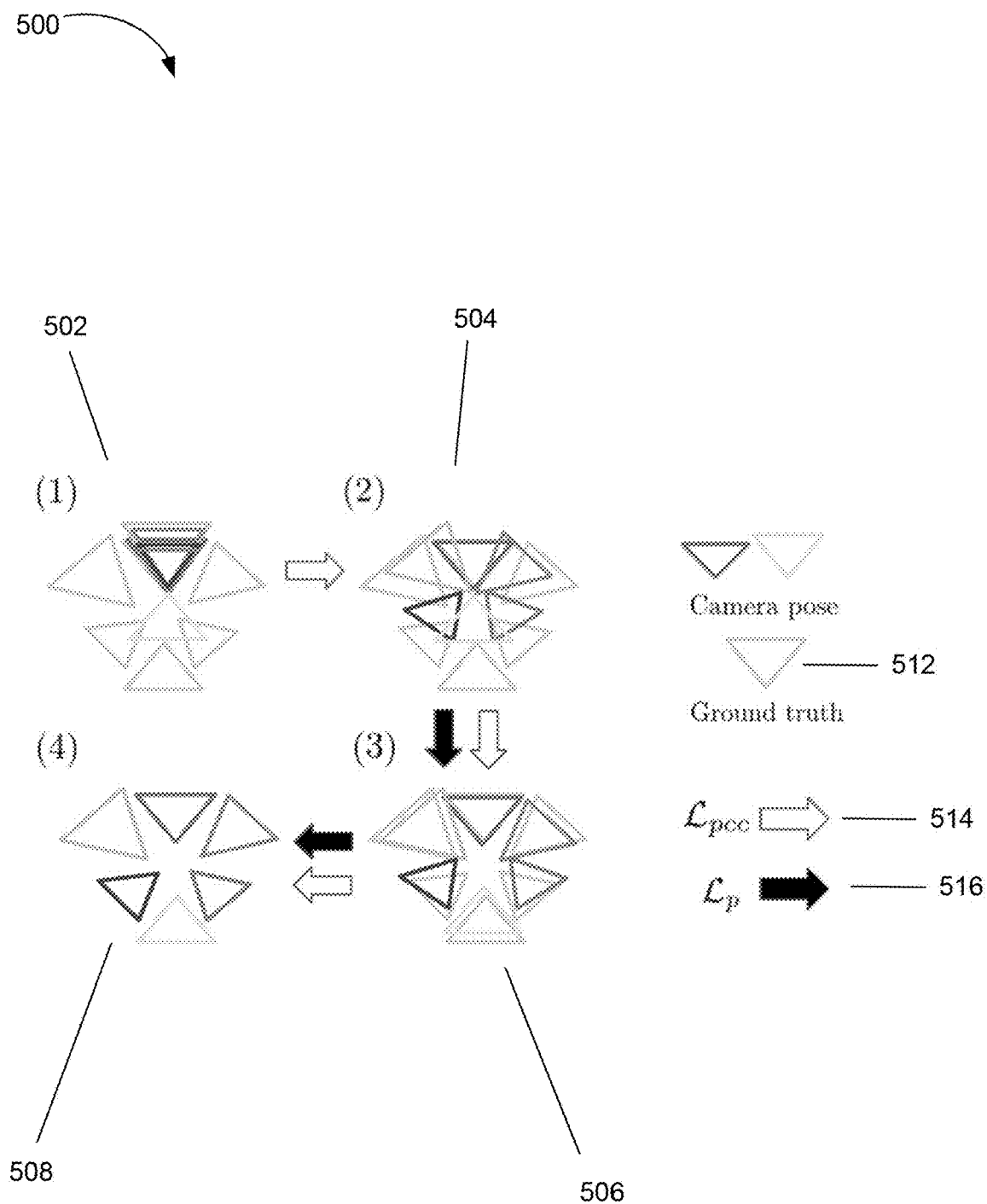
FIG. 5 is an example illustration of a curriculum learning of camera extrinsic parameters in a camera calibration system in accordance with the embodiments disclosed herein.

FIG. 5 shows an example illustration of a curriculum learning of camera extrinsic parameters in a camera calibration system 500. As shown in FIG. 5, a camera calibration system 500 may have a first operation 502 of performing scale-aware pretraining. Removing the scale ambiguity in depth and ego-motion learning is important in self-calibration as it may make target extrinsics metrically scaled. To inject metric scale without any calibration procedure, the output of the pose network may be normalized and multiplied with the magnitude of the relative translation. The relative translation may be obtained using ground-truth velocity 512, which may be the instantaneous velocity divided by the image sampling frequency. By using instantaneous velocity, any coordinate definition is eliminated when determining scale.

Introducing velocity supervision at training may produce scale-aware depth and pose networks. Instantaneous velocity measurements may be directly incorporated in the self-supervised training objective to learn a metrically accurate and scale-aware monocular depth map and ego-motion.

Using instantaneous velocity supervision at training may also allow the generation of scale-aware depth maps with the benefit of not requiring ground-truth depth scaling during testing. Further, using velocity supervision at training may also allow for the composition of metrically accurate trajectories directly from the output of the pose network.

The camera calibration system 500 may have a second operation 504 of performing pose consistency pretraining. The purpose of this operation 504 is the robust initialization of extrinsic rotation vectors. Using a pretrained pose network, the extrinsic rotation parameters may be optimized using only a pose consistency loss 514. By converting all predicted ego-motion transformations to the same coordinate frame of a single camera, the translation vectors and rotation matrices may be constrained to be similar across all of the cameras in camera calibration system 500 to generate a translation consistency loss and a rotation consistency loss. The translation consistency loss and a rotation consistency loss may be incorporated together to determine the pose consistency loss 514. The pose consistency constraint may dictate the pose network to produce predicted ego-motion to be the same across all cameras in a multi-camera setting, enforcing the learning of smaller rigid motion for all cameras.

The camera calibration system 500 may have a third operation 506 of performing photometric pretraining. The purpose of this operation 506 is to determine photometric consistency loss 516 and optimizing it with the pose consistency constraint 514 to determine extrinsic parameters. Using the predicted depth map, predicted ego-motion, camera intrinsics and a context image, a synthesized image based from a target image may be generated. By comparing the synthesized image from the target image, the photometric consistency loss 516 may be determined. Gradients from the photometric consistency loss 516 may be used to update the camera intrinsic parameters. Gradients from the photometric consistency loss 516 may be used to provide a photometric consistency constraint which may be used to generate a self-supervised training objective.

The camera calibration system 500 may have a fourth operation 508 of predicting accurate extrinsics. The photometric consistency constraint and the pose consistency constraint 514 may be optimized, along with the instantaneous velocity measurements, to generate a self-supervised training objective. The self-supervised training objective may be used to further improve depth estimation and predicted ego-motion. The self-supervised training objective may be incorporated into the training of the depth network and pose network, producing a scale-aware depth network and a scale-aware pose network, respectively. The scale-aware depth and pose networks may be able to estimate accurate, metrically-scaled extrinsics from raw, unlabeled image and video sequences. Moreover, with the self-supervised training objective being used to accurately update the scale-aware depth and pose networks, the system may simultaneously self-calibrate hundreds of multi-camera configurations, without depending on the supervision of additional 3D sensors or any manual labor.

Figure 6:
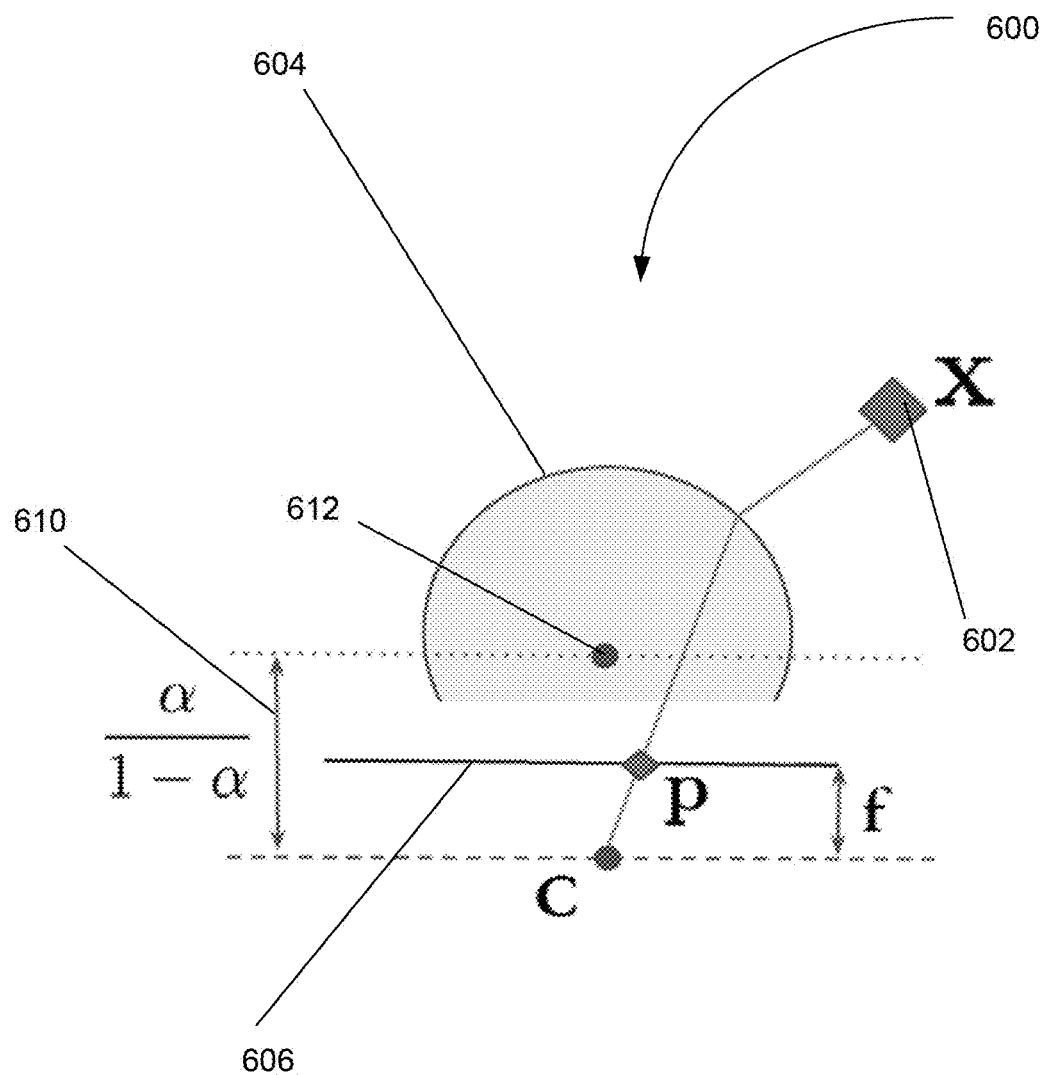
FIG. 6 is an example of a unified camera model in accordance with the embodiments disclosed herein.

In an embodiment, the UCM may be used to model camera parameters. The UCM is a parametric global central camera model. The UCM uses five parameters to represent a variety of camera geometries including perspective, fisheye, and catadioptric. FIG. 6 shows an example of the UCM 600. Referring now to FIG. 6, a 3D point 602 may be projected onto a unit sphere 604 and then projected onto the image plane 606 of a pinhole camera, shifted by a distance 610 from the center 612 of the sphere 604. The distance 610 may have a value of $$\frac{\alpha}{1-\alpha}.$$

$\alpha$ may be an additional parameter expressing distortion. The UCM may also be extended to include other geometries. For example, the Extended UCM ("EUCM") and Double Sphere Camera Model ("DS") are two extensions of the UCM. The EUCM may replace the unit sphere with an ellipse as the first projection surface and the DS may replace the single unit sphere with two unit spheres in the projection process. The EUCM may include, for example, an additional parameter, R. 3 may be a coefficient that represents the transformation of a unit sphere into an ellipse. The DS model may include additional parameters. Self-calibration, in accordance with embodiments disclosed herein, may be achieved for all three models and for a standard pinhole model.

Using the unified camera model may be advantageous because it has an easily computed, closed-form unprojection function. This achieves computational efficiency. Many parameterizations for the UCM are possible. In an embodiment, a parameterization for the UCM extending the pinhole camera model with a single additional parameter may be used. The pinhole model may be expressed as $(f_x, f_y, c_x, c_y)$ and, with additional parameter a, may form the UCM model. The additional parameter, a, may be a distortion parameter. As discussed above with respect to the EUCM and DS models, other parameters may be included. Those having skill in the art will understand how to modify the below functions to include other parameters associated with other models. According to the UCM model, the 3D-to-2D projection of a point P=(x, y, z) may be defined as:

$$\pi(P, i) = \begin{bmatrix} f_x \frac{x}{ad + (1-\alpha)x} \\ f_y \frac{y}{ad + (1-\alpha)x} \end{bmatrix} + \begin{bmatrix} c_x \\ c_y \end{bmatrix}$$

where the camera parameters may be expressed as $i=(f_x, f_y, c_x, c_y, \alpha)$ and the depth, d, may be expressed as $d=\sqrt{x^2+y^2+z^2}$.

A pixel, p, may be expressed as p=(u, v, 1). The unprojection operation of a pixel, p, at an estimated depth, $\hat{d}$, may be given by:

$$\phi(p, \hat{d}, i) = \hat{d} \frac{\xi + \sqrt{1 + (1-\xi^2)r^2}}{1+r^2} \begin{bmatrix} m_x \\ m_y \\ 1 \end{bmatrix} - \begin{bmatrix} 0 \\ 0 \\ \hat{d}\xi \end{bmatrix}$$

where $m_x = \frac{u-c_x}{f_x}(1-\alpha); m_y = \frac{v-c_y}{f_y}(1-\alpha);$ $$r^2 = m_x^2 + m_x^2; \text{ and } \xi = \frac{\alpha}{1-\alpha}.$$

As expressed above, the UCM camera model may provide closed-form projection and unprojection functions that are both differentiable. Using the UCM may then allow for an overall function that is entirely differentiable with respect to all parameters. For instance, such a function may be differentiable with respect to neural network parameters—the pose and depth estimation, as well as the camera model parameters. Having a function that is entirely differentiable for pose, depth, and camera parameters enables learning self-calibration end-to-end from only raw video.

The ability to learn a camera model only from raw video may present advantages over other systems and methods. For example, such a system can calibrate a wide range of camera models anytime and anywhere using only captured video. Even video in uncontrolled, unknown, or changing settings may be used to determination parameters for a range of camera models. Using raw video only may eliminate the need to save, store, and utilize synthetic data. Use of synthetic data may increase processing costs which may require additional communication capability to load and access the synthetic data. Additionally, synthetic data likely will not exist for many uncontrolled settings limited "on-the-go" calibration capabilities.

Figure 7:
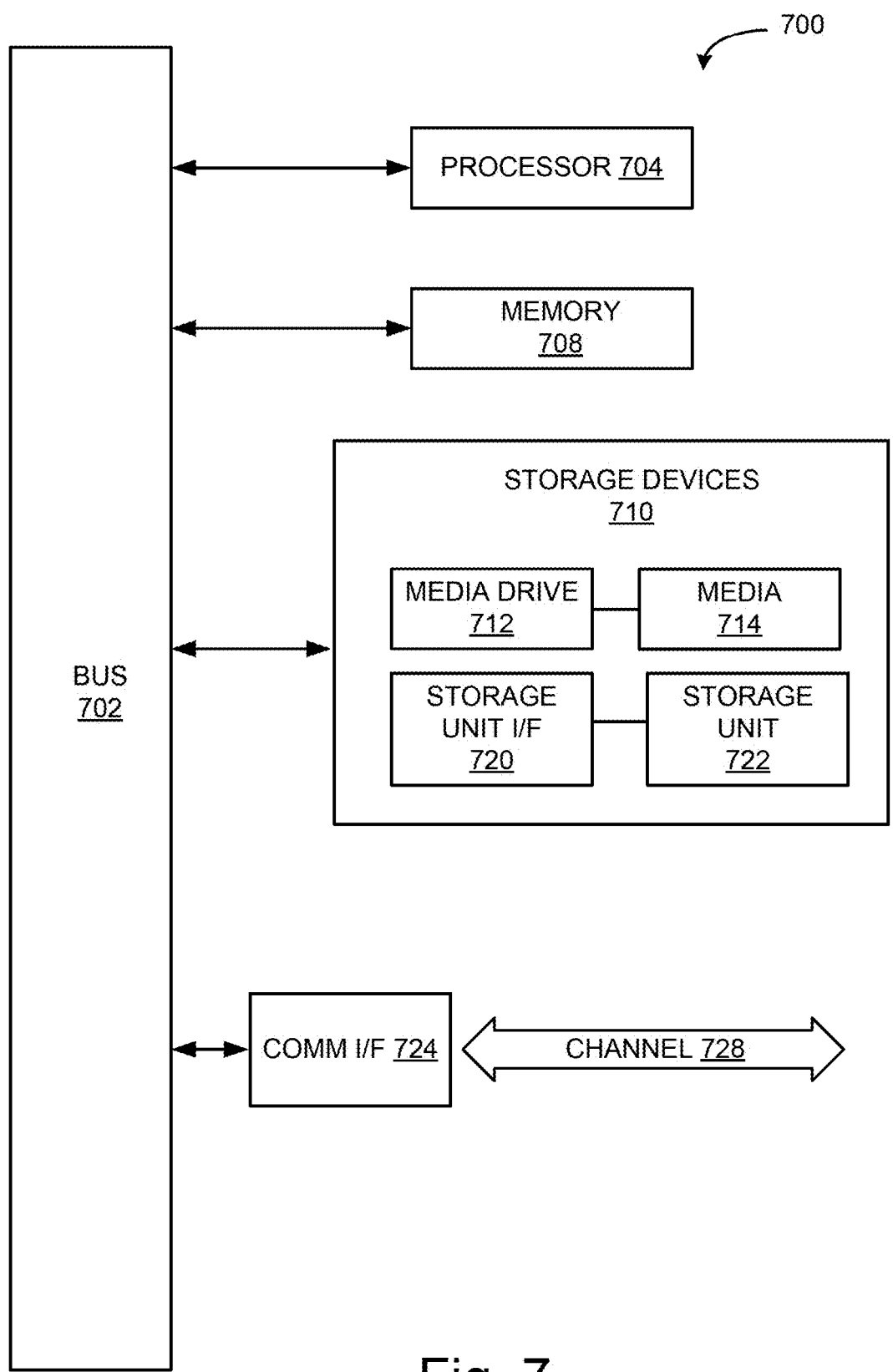
FIG. 7 is an example computing component that may be used to implement various features of embodiments described in the present disclosure.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor, and/or any one or more of the components making up a user device, a user system, and/or a non-decrypting cloud service. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 708. For example, random access memory (RAM) or other dynamic memory, might be used for storing information and instructions to be executed by processor 704. Main memory 708 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative embodiments, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage units 722 and interfaces 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or soft modem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 720, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for self-supervised scale-aware learning of camera extrinsic parameters, the system comprising:
   one or more processors; and
   a memory communicably coupled to the one or more processors and including instructions that when executed by the one or more processors cause the one or more processors to:
   process instantaneous velocity between a target image and a context image captured by a first camera;
   jointly train a depth network and pose network based on scaling by the instantaneous velocity, wherein the depth network produces predicted depth maps for the target image and the pose network predicts the relative rigid-body transformation between the target image and the context image;
   process, using the depth network, the target image to produce a depth map;
   process, using the pose network and the instantaneous velocity, the target image and the context image to produce an ego-motion of the first camera;
   generate a synthesized image from the target image using a reprojection operation based on the depth map, the ego-motion and the context image;
   determine photometric loss by comparing the synthesized image to the target image;
   generate photometric consistency constraint using a gradient from the photometric loss;
   determine pose consistency constraint between the first camera and a second camera; and
   optimize the photometric consistency constraint, the pose consistency constraint, the depth network and the pose network to generate estimated extrinsic parameters.

2. The system of claim 1, further comprising instructions that cause the one or more processors to:
   regularize the depth map to provide smoothing of depth estimations.

3. The system of claim 1, wherein the synthesized image is generated from the target image using the reprojection operation further based on camera intrinsics and the camera intrinsics are associated with a parametric camera model.

4. The system of claim 3, further comprising instructions that cause the one or more processors to:
   update the camera intrinsics on a per-image sequence basis using the gradient from the photometric loss.

5. The system of claim 1, wherein the scaling by the instantaneous velocity is used to train the depth network to produce metrically accurate and scale-aware depth maps.

6. The system of claim 1, wherein the scaling by the instantaneous velocity is used to train the pose network to produce metrically accurate and scale-aware ego-motion.

7. The system of claim 1, wherein the determine pose consistency constraint between the first camera and a second camera comprises:
   processing, using the pose network and the instantaneous velocity, a second target image and a second context image to produce a second ego-motion, wherein the second target image and the second context image are captured by the second camera;
   converting the second ego-motion of the second camera to a coordinate frame of the first camera;
   in response to converting the second ego-motion to the coordinate frame of the first camera, constraining translation vectors of the first and second cameras to determine a translation consistency loss;
   in response to converting the second ego-motion to the coordinate frame of the first camera, converting rotation matrices of the first and second cameras to determine a rotation consistency loss; and
   determining a pose consistency loss by combining the translation consistency loss and the rotation consistency loss.

8. The system of claim 7, further comprising instructions that cause the one or more processors to:
   train the depth network and the pose network according to the pose consistency loss to generate metrically accurate and scale-aware depth maps and ego-motion.

9. The system of claim 1, further comprising instructions that cause the one or more processors to:
   receive a first set of images captured by the first camera and a second set of images captured by the second camera;
   warp images between the first set and the second set;

generate spatio-temporal contexts by processing the warped images across a spatial axis and a temporal axis; and jointly train the depth network and the pose network with the spatio-temporal contexts.

10. The system of claim 1, wherein the first camera and the second camera are rigged to a vehicle.

11. The system of claim 10, wherein the ego-motion of the first camera is identical to an ego-motion of the second camera.

12. A non-transitory computer-readable medium for self-supervised scale-aware learning of camera extrinsic parameters and storing instructions that when executed by one or more processors cause the one or more processors to:

process instantaneous velocity between a target image and a context image captured by a first camera;

jointly train a depth network and pose network based on scaling by the instantaneous velocity, wherein the depth network produces predicted depth maps for the target image and the pose network predicts the relative rigid-body transformation between the target image and the context image;

process, using the depth network, the target image to produce a depth map;

process, using the pose network and the instantaneous velocity, the target image and the context image to produce an ego-motion of the first camera;

generate a synthesized image from the target image using a reprojection operation based on the depth map, the ego-motion and the context image;

determine photometric loss by comparing the synthesized image to the target image;

generate photometric consistency constraint using a gradient from the photometric loss;

determine pose consistency constraint between the first camera and a second camera; and optimize the photometric consistency constraint, the pose consistency constraint, the depth network and the pose network to generate estimated extrinsic parameters.

13. The non-transitory computer-readable medium of claim 12, further comprising instructions that cause the one or more processors to:

regularize the depth map to provide smoothing of depth estimations.

14. The non-transitory computer-readable medium of claim 12, wherein the scaling by the instantaneous velocity is used to train the depth network to produce metrically accurate and scale-aware depth maps.

15. The non-transitory computer-readable medium of claim 12, wherein the scaling by the instantaneous velocity is used to train the pose network to produce metrically accurate and scale-aware ego-motion.

16. The non-transitory computer-readable medium of claim 12, wherein the determine pose consistency constraint between the first camera and a second camera comprises:

processing, using the pose network and the instantaneous velocity, a second target image and a second context image to produce a second ego-motion, wherein the second target image and the second context image are captured by the second camera;

converting the second ego-motion of the second camera to a coordinate frame of the first camera;

in response to converting the second ego-motion to the coordinate frame of the first camera, constraining translation vectors of the first and second cameras to determine a translation consistency loss;

in response to converting the second ego-motion to the coordinate frame of the first camera, converting rotation matrices of the first and second cameras to determine a rotation consistency loss; and determining a pose consistency loss by combining the translation consistency loss and the rotation consistency loss.

17. The non-transitory computer-readable medium of claim 12, further comprising instructions that cause the one or more processors to:

train the depth network and the pose network according to the pose consistency loss to generate metrically accurate and scale-aware depth maps and ego-motion.

18. The non-transitory computer-readable medium of claim 12, further comprising instructions that cause the one or more processors to:

receive a first set of images captured by the first camera and a second set of images captured by the second camera;

warp images between the first set and the second set;

generate spatio-temporal contexts by processing the warped images across a spatial axis and a temporal axis; and jointly train the depth network and the pose network with the spatio-temporal contexts.

19. The non-transitory computer-readable medium of claim 12, wherein the synthesized image is generated from the target image using the reprojection operation further based on camera intrinsics and the camera intrinsics are associated with a parametric camera model, and the medium further comprises instructions that cause the one or more processors to:

update the camera intrinsics on a per-image sequence basis using the gradient from the photometric loss.

20. A method of self-supervised scale-aware learning of camera extrinsic parameters, the method comprising:

processing instantaneous velocity information between a target image and a context image captured by a first camera;

jointly training a depth network and pose network based on scaling by the instantaneous velocity, wherein the depth network produces predicted depth maps for the target image and the pose network predicts the relative rigid-body transformation between the target image and the context image;

processing, using the depth network, the target image to produce a depth map;

processing, using the pose network and the instantaneous velocity, the target image and the context image to produce an ego-motion of the first camera;

generating a synthesized image from the target image using a reprojection operation based on the depth map, the ego-motion and the context image;

determining photometric loss by comparing the synthesized image to the target image;

generating photometric consistency constraint using a gradient from the photometric loss;

determining pose consistency constraint between the first camera and a second camera; and optimizing the photometric consistency constraint, the pose consistency constraint, the depth network and the pose network to generate estimated extrinsic parameters.

* * * * *